United States Patent [19]

Ball et al.

[11] Patent Number: 5,714,535

[45] Date of Patent: Feb. 3, 1998

[54] STABILIZERS FOR HIGH NITRILE MULTIPOLYMERS

[75] Inventors: Lawrence E. Ball, Akron; Muyen Wu, Hudson; Eddie Wardlow, Shaker Hts., all of Ohio

[73] Assignee: The Standard Oil Company, Cleveland, Ohio

[21] Appl. No.: 649,153

[22] Filed: May 17, 1996

Related U.S. Application Data

[63] Continuation-in-part of Ser. No. 494,833, Jun. 26, 1995, abandoned, which is a continuation-in-part of Ser. No. 171,487, Dec. 21, 1993, abandoned.

[51] Int. Cl.$^6$ .................................................. G08K 5/04
[52] U.S. Cl. .................. 524/399; 524/238; 524/241; 524/400
[58] Field of Search ................................ 524/238, 241, 524/399, 400

[56] References Cited

U.S. PATENT DOCUMENTS

| | | | |
|---|---|---|---|
| 3,240,750 | 3/1966 | Bonvicini | 524/314 |
| 3,520,847 | 7/1970 | Runge et al. | 524/105 |
| 3,565,876 | 2/1971 | Ball et al. | 528/481 |
| 3,954,913 | 5/1976 | Uebele et al. | 524/94 |
| 3,984,499 | 10/1976 | Wardlow Jr., et al. | 525/301 |

*Primary Examiner*—Kriellion S. Morgan
*Attorney, Agent, or Firm*—David J. Untener; Michael F. Esposito; Teresan W. Gilbert

[57] ABSTRACT

A melt processable high nitrile multipolymer such as an acrylonitrile olefinically unsaturated, multipolymer, which is stabilized by admixing with maleic acid, derivatives of maleic acid, salts of maleic acid, maleic anhydride, maleamides, salts of maleamides, maleates, salts of maleates, and combinations thereof.

12 Claims, No Drawings

STABILIZERS FOR HIGH NITRILE MULTIPOLYMERS

RELATED APPLICATION

This is a continuation-in-part of application Ser. No. 08/494,833 filed on Jun. 26, 1995 now abandoned, which is a continuation-in-part of U.S. patent application Ser. No. 08/171,487 filed on Dec. 21, 1993 now abandoned.

BACKGROUND OF THE INVENTION

1. Field of the Invention

The present invention relates to a stabilizer composition for high nitrile multipolymers, in particular an acrylonitrile olefinically unsaturated multipolymer and the like and a method for stabilizing the high nitrile multipolymer. More particularly, the invention relates to the stabilization of an acrylonitrile olefinically unsaturated multipolymer and the like against thermal degradation, melt processing conditions and heat discoloration by the inclusion of maleic acid and its derivatives, salts of maleic acid, maleic anhydrides, maleamides and its salts and maleates and its salts into the nitrile multipolymer. It is understood that the term multipolymer includes copolymers, terpolymers and multimonomer polymers throughout this specification.

2. Description of the Prior Art

Nitrile polymers have excellent physical, thermal and mechanical properties such as barrier properties, chemical resistance, rigidity, heat resistance, UV resistance, moisture retention and bacteria resistance. Acrylic polymers are high nitrile polymers that are desirable in the production of fibrous textiles, films, molded objects, packaging applications and the like.

However, acrylic polymers and other high nitrile multipolymers having long repeating sequences of the same nitrile monomer unit, in particular an acrylonitrile monomer unit, are known to degrade when heated and processed by commercial methods. The long sequences of nitrile monomer units make the acrylic polymers non-processable without the use of a solvent because the polymer degrades at an ever increasing rate above 150° C. The acrylic polymer further becomes yellow, orange, red and eventually black as it degrades.

An acrylonitrile olefinically unsaturated multipolymer is disclosed in U.S. Ser. No. 08/387,303 entitled "A Process for Making a High Nitrile Multipolymer Prepared From Acrylonitrile and Olefinically Unsaturated Monomers." An acrylonitrile/methacrylonitrile copolymer is disclosed in U.S. Ser. No. 08/150,515 entitled "A Process for Making a Polymer of Acrylonitrile, Methacrylonitrile and Olefinically Unsaturated Monomers" and a multipolymer of acrylonitrile/methacrylonitrile/olefinically unsaturated monomer is disclosed in U.S. Ser. No. 08/149,880 entitled "A Process for Making an Acrylonitrile/Methacrylonitrile Copolymer." The acrylonitrile/methacrylonitrile multipolymers are thermally processed without the use of solvents to yield acrylic fibers. However, the multipolymers are subject to thermal degradation albeit not as severely as the commercial acrylic fiber polymer.

Thermoplastic nitrile barrier polymer resins are known in the art and have been described in U.S. Pat. Nos. 3,426,102; 3,586,737 and 5,106,925. These nitrile polymers are known to have desirable barrier properties and chemical resistance. However, these thermoplastic nitrile polymers while melt-processable are difficult to process.

It is advantageous to reduce the thermal degradation and prevent thermal discoloration of high nitrile multipolymers. There is a need to readily melt process an acrylonitrile olefinically unsaturated multipolymer and the like without thermal degradation, thermal discoloration and decrease of the viscosity of the high nitrile multipolymer.

It has been discovered that maleic acid and its derivatives and its salts, maleic anhydrides, maleamides and their salts and maleates and their salts greatly reduce thermal degradation, thermal discoloration and decrease the viscosity when added to a high nitrile multipolymer, in particular an acrylonitrile olefinically unsaturated multipolymer.

U.S. Pat. No. 3,954,913 entitled "Stabilized Nitrile Polymers" and U.S. Pat. No. 3,984,499 entitled "Thermally Stable High Nitrile Resins and Methods for Producing the Same" both assigned to The Standard Oil Company relate to nitrile polymers, in particular a Barex® polymer which is a 75:25 acrylonitrile/methyl acrylate polymer containing 5% to 25% of an elastomeric component. The patents disclose that the nitrile polymer can be stabilized against thermal discoloration by certain derivatives of maleic acid, in particular mono-esters of certain organic polycarboxylic acids. It has been reported by *Faserforschung und Textiltechnik*, Volume 21, No. 3 (1970), that maleic acid and some of its derivatives are useful inhibitors against thermal discoloration of a nitrile polymer. Further, it states that "the complete indifference of the maleic acid esters" for the stabilization of nitrile polymers. U.S. Pat. No. 3,520,847 discloses that maleimides and derivatives thereof are thermal and antidiscoloration agents for acrylonitrile polymers and copolymers. The article and the patents do not disclose nor suggest the use of maleic acid and its derivatives, maleic acid and its salts, maleic anhydrides, maleamides and their salts, and maleates and their salts for the reduction of thermal degradation and maintenance of melt processability of a high nitrile polymer.

It is advantageous to reduce the thermal degradation and thermal discoloration of high nitrile multipolymers by the stabilizer composition of the present invention. The stabilizer composition reduces melt viscosity and prevents further increases of viscosity of the high nitrile multipolymer during melt processing. Further, the stabilizer composition of the present invention reduces crosslinking and molecular weight build-up of the high nitrile multipolymer during melt processing. Additionally, color development of the nitrile multipolymer during thermal processing is retarded.

SUMMARY OF THE INVENTION

A stabilizer composition for a high nitrile multipolymer comprises maleic acid and its derivatives, maleic acid and its salts, maleic anhydride, maleamides and their salts, and maleates and their salts. The inclusion of the stabilizer composition in a high nitrile multipolymer reduces thermal degradation, discoloration, molecular weight growth and cross-linking which lead to intractability and increased melt viscosity of the multipolymer.

The present invention relates to a composition comprising a melt processable high nitrile multipolymer said multipolymer being in admixture with a stabilizer composition comprising maleic acid and its derivatives, maleic acid and its salts, maleic anhydride, maleamides and their salts, maleates and their salts and combinations thereof and wherein the stabilizer composition reduces thermal degradation, reduces the rate of increase of melt viscosity during thermal processing and reduces thermal discoloration of the high nitrile multipolymer.

The process of the present invention produces a thermally stable nitrile multipolymer, in particular a thermally stable acrylonitrile olefinically unsaturated multipolymer. The thermally stable nitrile multipolymer may be further processed by spinning into fibers, injection molding, extrusion, blow extrusion, blow molding and the like.

DETAILED DESCRIPTION OF THE INVENTION

The present invention relates to a stabilizer composition for a high nitrile multipolymer, in particular an acrylonitrile olefinically unsaturated multipolymer, and a method for stabilizing the high nitrile multipolymer. The novel stabilizer composition is compatible with the nitrile multipolymer.

The stabilizer composition for addition into the high nitrile multipolymer includes but is not limited to maleic acid and its derivatives, maleic acid and its salts, maleic anhydride, maleamides and their salts, and maleates and their salts. The preferred stabilizer compositions maleates and their salts.

The salts of maleic acid include but are not limited to the salts found in Group IIA and IIIB of the Periodic Table of Elements, salts of organic bases such as amines, and the like. Useful amines include, but are not limited to, primary, secondary and tertiary alkyl and aryl amines containing $C_1$ through $C_{18}$. Calcium and magnesium are the preferred salts. The salts can be used alone or in combination.

The maleates include but are not limited to esters of maleic acid of the formula:

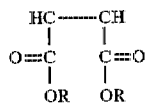

wherein each R is independently selected from hydrogen (H), $C_4$ to $C_{18}$ alkyl group, aryl group, alkyl substituted $C_7$ to $C_{24}$ aryl group and combinations thereof. Exemplary esters of maleic acid are alkyl half esters of maleic acid, diesters of maleic acid, cetyl maleate, di-cetyl maleate, octyl maleate, di-octyl maleate, lauryl maleate, di-lauryl maleate, butyl maleate, di-butyl maleate, hexadecyl maleate, di-hexadecyl maleate, 2-ethylhexyl maleate, di-2-ethylhexyl maleate, phenyl maleate, di-phenyl maleate, tridecyl maleate, di-tridecyl maleate, octadecyl maleate, di-octadecyl maleate and the like. The preferred maleates are lauryl maleate, tridecyl maleate, octadecyl maleate, and hexadecyl maleate.

The salts of maleates include, but are not limited to, the salts found in Group IIA and IIIB of the Periodic Table of Elements, salts of organic bases such as amines and the like. Useful amines include, but are not limited to, primary, secondary, and tertiary alkyl and aryl mines containing $C_1$ through $C_{18}$. The preferred salts are calcium and magnesium. The salts can be used alone or in combination.

The maleamides include, but are not limited to, maleic acid monoamide of the formula HO—CO—C=C—CO—NH—R and maleic acid diamide of the formula R—NH—CO—C=C—CO—NH—R wherein R is independently selected from, hydrogen (H), $C_4$ to $C_{18}$ alkyl group, aryl group, alkyl substituted $C_7$ to $C_{24}$ aryl group and combinations thereof. The maleamides include mono-alkyl amides of maleic acid, di-alkyl amides of maleic acid, mono-aryl amides of maleic acid, di-arylamides of maleic acid and the like. Exemplary maleamides are cetyl maleamide, di-cetyl maleamide, octyl maleamide, di-octyl maleamide, lauryl maleamide, di-lauryl maleamide, butyl maleamide, di-butyl maleamide, hexadecyl maleamide, di-hexadecyl maleamide, 2-ethylhexyl maleamide, di-2-ethylhexyl maleamide, phenyl maleamide, di-phenyl maleamide, tridecyl maleamide, di-tridecyl maleamide, octadecyl maleamide, di-octadecyl maleamide and the like.

The salts of the maleimides include, but are not limited to, the salts found in Group IIA and IIIB of The Periodic Table of Elements, salts of organic bases such as amines, and the like. Useful amines include, but are not limited to, primary, secondary, tertiary alkyl and aryl amines containing $C_1$ through $C_{18}$. The preferred salts are calcium and magnesium. The salts can be used alone or in combinations.

The stabilizer composition can be used alone or in combination. The stabilizer composition can also be used with other additives such as plasticizers, pigments, anti-oxidants, fillers, dyes, delustrants and the like depending on the properties desired to impart to the high nitrile multipolymer.

The stabilizer composition of the present invention is effective at low concentrations. The stabilizer composition is added to the high nitrile multipolymer in the range of about 0.1% to about 10% by weight, preferably about 0.2% to about 5% and most preferably about 0.3% to about 3% by weight of the nitrile multipolymer.

The stabilizer composition is a liquid or a solid and may be added to a nitrile multipolymer as a powder, a liquid, an emulsion, or a solution. The stabilizer composition of the present invention is typically added to the high nitrile multipolymer subsequent to the polymerization reaction. For example, the stabilizer composition, as an emulsion in water, may be added to the high nitrile multipolymer emulsion latex or suspension slurry prior to the isolation of the multipolymer, i.e. the coagulation step and subsequent processing. The stabilizer composition, as a powder, a liquid, a solution, or an emulsion may be added by dry blending with the isolated multipolymer strands or powder and the resulting blends can be pelletized and/or extruded into fibers, sheets or other shapes.

Exemplary high nitrile multipolymers are a nitrile multipolymer comprising an acrylonitrile monomer and one or more olefinically unsaturated monomers that are polymerized to produce a melt processable acrylonitrile olefinically unsaturated multipolymer. The olefinically unsaturated monomer employed is any olefinically unsaturated monomer with a C=C double bond polymerizable with an acrylonitrile monomer.

The olefinically unsaturated monomer includes but is not limited to acrylates and their derivatives, methacrylates and their derivatives, acrylamide and its derivatives, methacrylamide and its derivatives, vinyl esters, vinyl ethers, vinyl amides, vinyl ketones, styrene and its derivatives, halogen containing monomers, ionic monomers; acid containing monomers, base containing monomers, olefins and the like. The olefinically unsaturated monomer can be one or more monomers from one or more groups of the olefinically unsaturated monomers. Thus, there can be more than one olefinically unsaturated monomer polymerized with the acrylontrile monomer.

The acrylates include but are not limited to $C_1$ to $C_{12}$ alkyl, aryl and cyclic acrylates such as methyl acrylate, ethyl acrylate, phenyl acrylate, butyl acrylate, isobornyl acrylate and 2-ethylhexyl acrylate and functional derivatives of the acrylates such as 2-hydroxyethyl acrylate, 2-chloroethyl acrylate and the like. The preferred acrylates are methyl acrylate and ethyl acrylate.

The methacrylates include but are not limited to $C_1$ to $C_{12}$ alkyl, aryl and cyclic methacrylates such as methyl methacrylate, ethyl methacrylate, phenyl methacrylate, butyl methacrylate, isobornyl methacrylate and 2-ethylhexyl methacrylate and functional derivatives of the methacrylates such as 2-hydroxyethyl methacrylate, 2-chloroethyl methacrylate and the like. The preferred methacrylate is methyl methacrylate. The methacrylate derivatives include methacrylonitrile.

The acrylamides and methacrylamides and each of their N-substituted alkyl and aryl derivatives include but are not limited to acrylamide, methacrylamides, N-methyl acrylamide, N, N-dimethyl acrylamide and the like.

The vinyl esters include but are not limited to vinyl acetate, propionate, butyrate and the like. The preferred vinyl ester is vinyl acetate.

The vinyl ethers include but are not limited to $C_1$ to $C_8$ vinyl ethers such as ethyl vinyl ether, butyl vinyl ether and the like.

The vinyl amides include but are not limited to vinyl pyrrolidone and the like.

The vinyl ketones include but are not limited to $C_1$ to $C_8$ vinyl ketones such as ethyl vinyl ketone, butyl vinyl ketone and the like.

The styrenes include but are not limited to styrene, indene and a styrene of the formula

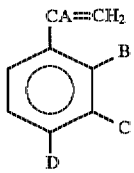

wherein each of A, B, C, and D is independently selected from hydrogen (H) and $C_1$ to $C_4$ alkyl group for example methylstyrenes, substituted styrenes, multiply-substituted styrenes and the like.

The halogen containing monomers include but are not limited to vinyl chloride, vinyl bromide, vinyl fluoride, vinylidene chloride, vinylidene bromide, vinylidene fluoride, halogen substituted propylene monomers and the like. The preferred halogen containing monomers are vinyl bromide and vinylidene chloride.

The ionic monomers include but are not limited to sodium vinyl sulfonate, sodium styrene sulfonate, sodium methallyl sulfonate, sodium acrylate, sodium methacrylate and the like. The preferred ionic monomers are sodium vinyl sulfonate, sodium styrene sulfonate and sodium methallyl sulfonate.

The acid containing monomers include but are not limited to acrylic acid, methacrylic acid, vinyl sulfonic acid, itaconic acid, styrene sulfonic acid and the like. The preferred acid containing monomers are itaconic acid, styrene sulfonic acid and vinyl sulfonic acid.

The base containing monomers include but are not limited to vinyl pyridine, 2-aminoethyl-N-acrylamide, 3-aminopropyl-N-acrylamide, 2-aminoethyl acrylate, 2-aminoethyl methacrylate and the like.

The olefins include but are not limited to isoprene, butadiene, $C_2$ to $C_8$ straight chain and branched alpha-olefins such as propylene, ethylene, isobutylene, diisobutylene, 1-butene and the like. The preferred olefins are isobutylene, ethylene and propylene.

Examples of a high nitrile multipolymer include but are not limited to acrylonitrile olefinically unsaturated multipolymer, acrylonitrile/methacrylonitrile/olefinically unsaturated multipolymer, acrylonitrile/methacrylonitrile multipolymer and the like. The preferred high nitrile multipolymer is an acrylonitrile olefinically unsaturated multipolymer.

Exemplary methods to make acrylonitrile olefinically unsaturated multipolymer are described in U.S. Ser. No. 08/387,303 entitled "A Process for Making a High Nitrile Multipolymer Prepared From Acrylonitrile and Olefinically Unsaturated Monomers", an acrylonitrile/methacrylonitrile multipolymer is described in U.S. Pat. No. 5,106,925 entitled "Preparation of Melt-Processable Acrylonitrile/ Methacrylonitrile Copolymers", and U.S. Ser. No. 08/149,880 entitled "A Process for Making an Acrylonitrile/ Methacrylonitrile Copolymer" and an acrylonitrile/ methacrylonitrile/olefinically unsaturated multipolymer is described in U.S. Ser. No. 08/150,515 entitled "A Process for Making a Polymer of Acrylonitrile, Methacrylonitrile and Olefinically Unsaturated Monomers." All four applications are assigned to The Standard Oil Company and incorporated herein.

The nitrile multipolymer can be prepared by any known method such as an emulsion, a solution, a suspension or in continuous addition bulk process. The polymerization process is generally carried out as an aqueous emulsion or suspension process in the presence of a multimonomer feed mixture of an acrylonitrile monomer and an olefinically unsaturated monomer; a surfactant or suspending aid; optionally a molecular weight modifier; and a free radical initiator at a temperature in the range of about 40° C. to 120° C. in the substantial absence of molecular oxygen. The acrylonitrile olefinically unsaturated multimonomer feed mixture contains about 95% by weight to about 20% by weight acrylonitrile monomer, 80% by weight to about 5% by weight olefinically unsaturated monomer. The polymerization process is carried out by continuous or incremental addition of each of the reactants.

The reaction is continued until polymerization has proceeded to the desired extent, generally from about 40% to about 99% conversion and preferably from about 70% to about 95% conversion. The high nitrile multipolymer generally contains 50% by weight to about 95% by weight polymerized acrylonitrile and about 5% by weight to about 50% by weight polymerized olefinically unsaturated monomer.

At the conclusion of the polymerization reaction the acrylonitrile olefinically unsaturated multipolymer is isolated as a slurry, or a latex. Any known technique may be used to isolate the acrylonitrile olefinically unsaturated multipolymer such as crumb coagulation, spraying the solution of the multipolymer into a heated and/or evacuated chamber to remove the water vapors, stripping, filtration, centrifugation and the like.

The high nitrile multipolymer has reduced thermal degradation, reduced thermal discoloration and exhibited less melt viscosity increase in subsequent thermal processing steps due to the presence of the stabilizer composition in the high nitrile multipolymer.

The high nitrile multipolymer with the stabilizer composition may be processed into a wide variety of useful articles by thermal melt spinning, extrusion in the absence of solvent and in the absence of water, injection molding, calendering, vacuum forming, milling, molding, drawing, blowing and the like. The use of the stabilizer reduces thermal degradation, discoloration, cross-linking and melt viscosity increase of the nitrile multipolymer products during the thermoprocessing of the nitrile multipolymer.

SPECIFIC EMBODIMENTS

The following examples demonstrate the process and advantages of the present invention.

Multipolymer Preparation

Equipment

A 50 gallon circulating hot water jacketed stainless steel reactor was equipped with a reflux condenser, thermocouple/controller, a turbine agitator, nitrogen gas inlet line, vacuum line, and two monomer feed stream pumps. The two monomer feed mixtures were metered, as separate single solutions, by constant feed pumps.

Procedure

The reactor was initially charged with about 293 lbs. of distilled water, about 2.75 lbs. of Rhofac RE-610, about 0.85 lbs. of N-octyl mercaptan, about 7.04 lbs. of acrylonitrile monomer and about 2.96 lbs. of methacrylonitrile monomer. The reactor was then purged with nitrogen and heated to about 60° C. After temperature was obtained, a slurry containing 0.47 lbs. of the initiator Vazo 52, about two lbs. of water and about 0.25 lbs. of Rhofac RE-610 was added along with two separate monomer feed streams. The first monomer feed was composed of about 70.4 lbs. of acrylonitrile and about 29.6 lbs. of methacrylonitrile and fed to the reactor at a uniform rate over a period of about 270 minutes. The second monomer feed was pure methacrylonitrile which was fed to the reactor at about 0.0222 lbs/min. for about the first 90 minutes, at about 0.0356 lbs/min. from about 90 to about 180 minutes and finally at a rate of 0.113 lbs./min. for about 180 to about 270 minutes. During the course of the reaction, about 1.19 lbs of N-octyl mercaptan was added at about 90 minutes and at about 180 minutes.

At the end of the reaction (about 270 minutes) the reaction was stripped of unreacted monomer by vacuum stripping at about 60° C. for about three hours. The latex was then coagulated with alum solution at about 81° C. to about 85° C. and washed with water at about 75° C., and dried. The result was a course, free flowing, white polymer powder, designated polymer A. The multipolymer composition of A was 54% (wt.) acrylonitrile and 46% (wt.) methacrylonitrile with a molecular Weight of 143,000.

Preparation of Mono Esters of Maleic Acid

Maleate monoesters were prepared by reacting equal molar quantities of an alcohol and maleic anhydride under anhydrous conditions. For example, monolauryl maleate was prepared by reacting about 5.27 moles of lauryl alcohol (1-dodecanol), with about 5.27 moles of maleic anhydride. The alcohol was melted in about a 50° C. air oven, weighed, and poured into a jacketed glass 2 liter reactor which had been preheated to about 50° C. The crushed maleic anhydride was added to the melted alcohol and stirring was started. The reactor was fitted with a 3" 4-bladed Teflon paddle rotating at about 350 rpm. The reactor was open to the atmosphere via a port which was fitted with a drying tube containing anhydrous $CaSO_4$. Heat was supplied to the reactor by circulating water, from a thermostatically controlled bath, through the jacket. After about 25 minutes the temperature of the reaction mixture was increased to about 60° C. The appearance of the reactants changed from a slurry to a hazy liquid to, finally, a clear colorless liquid. After another hour the temperature was increased to about 70° C. Thirty minutes later the temperature was raised to about 80° C., where it remained for the balance of the 6 hour total reaction time. The liquid product was poured directly from the reactor, without cooling, into a series of shallow trays, where the liquid was allowed to cool and solidify. The product was broken up and bottled. About 1516.6 g product was obtained resulting in about a 99.43% recovery. NMR analysis of the product showed the product consisted of about 94.2% monolauryl maleate, about 3.7% dilauryl maleate, about 1.0% maleic acid, and about 1.1% lauryl alcohol.

Stabilizer Addition Procedure

Powder Blending

Finely divided stabilizer is dry blended with polymer powder by any effective mixer. For example, about 1.04 gms. of the stabilizer that has been ground in a mortar and pestle to a powder is added to about 50.96 gms of polymer. This powder was blended on a roll-mill for 3 hours before being subjected to melt processing evaluation.

Latex Blending

An aqueous emulsion of the stabilizer is mixed with the polymer latex and the two are co-coagulated to yield an intimately mixed stabilizer/polymer crumb. A stabilizer emulsion was prepared by heating a mixture of about 10 gms lauryl maleate and about 2 gms of Dowfax 2A (emulsifier manufactured by Dow Chem. Co.) to about 60° C. until homogeneous. To the mixture was added about 88 gms. of about 60° C. water gradually with stirring. The pH of the mixture was then adjusted to 6 by the addition of ammonium hydroxide yielding a low viscosity, translucent emulsion. This stabilizer emulsion can be added in the desired amount to the polymer latex to achieve the needed level.

Testing Procedure

Brabender Plasticorder

The Brabender plasticorder is a low shear melt mixing device that measures the torque (m-gms) required to melt stir a molten polymer and is manufactured by the Brabender Instrument Co., S. Hackensack, N.J. The Brabender Plasticorder is routinely used to judge the melt processability of Barex® resins as a quality control measure. It can easily determine whether a polymer can be melted and processed on normal thermoplastic equipment. Brabender analyses were run at about 200° C. with torque readings taken at about 5 minute intervals to about 30 minutes. This method measures polymer degradation as a function of time, temperature, and physical abrading.

Color

About 1 gram of multipolymer sample with stabilizer is withdrawn from the Brabender after 10 minutes and again after 30 minutes. Each sample is dissolved in dimethylformamide (DMF) to make a 5.0% by weight solution in the DMF. Each solution is then compared to the Gardner Color Standards for Liquid 1953 Series, made by Gardner Laboratory, Inc., Bethesda, Md. The Color Standards for Liquid describes color on a scale of 1 to 18, wherein 1 describes a colorless liquid and 18 describes a beer bottle brown color.

Stabilizer Evaluation

EXAMPLE 1

Polymer A

Dry blends were prepared from Polymer A and various maleic acid derivatives at the 2% (by weight) level. These blends were subjected to Brabender plastication and torque measurements at about 200° C. at about 35 rpm. The torque required to masticate the melt, a measure of melt viscosity, was reported in meter-grams (m-gm).

TABLE I

| Sample Composition | Torque (m-gm), 200° C. | | |
|---|---|---|---|
| | 10 min. | 20 min. | 30 min. |
| Polymer A (blank) | 2632 | 2739 | 3494 |
| Maleic acid | 2611 | 2842 | 3058 |
| Maleic anhydride | 2243 | 2446 | 2536 |
| Cetyl maleate | 828 | 782 | 748 |

TABLE I-continued

| Sample Composition | Torque (m-gm), 200° C. | | |
|---|---|---|---|
| | 10 min. | 20 min. | 30 min. |
| Lauryl maleate | 833 | 773 | 839 |
| Di-2-ethylhexyl maleate | 1271 | 1493 | 1782 |
| Maleimide | 2163 | 2420 | 2548 |
| Phenyl maleimide | 2207 | 2295 | 2278 |

The above results demonstrate that the addition of the stabilizer composition in the acrylonitrile/methacrylonitrile multipolymer reduces the initial melt viscosity and retards its growth during the melt processing. For instance, lauryl maleate and cetyl maleate in the nitrile multipolymer show essentially no viscosity increase in about 30 minutes at about 200° C. The above comparison of stabilizers demonstrate that the maleates are unexpectedly better than the maleimides.

EXAMPLE 2

Polymer B, Mono Maleate Ester Evaluation

Polymer B of the same AN/MAN composition as Polymer A but having a molecular weight of 69,000 was dry blended with various maleate mono esters and subjected to Brabender plastication at about 200° C. and about 35 rpm.

Dry blends were prepared from the polymer B and various maleic acid derivatives at the 2% (by weight) level. These blends were subjected to Brabender plastication and torque measurements at about 200° C. at about 35 rpm. The torque required to masticate the melt, a measure of melt viscosity, is reported in meter-grams (m-gm).

TABLE II

| Sample Composition | Torque (m-gm), 200° C. | | |
|---|---|---|---|
| | 10 min. | 20 min. | 30 min. |
| Polymer B | 1883 | 2272 | 2540 |
| 2-Ethylhexyl maleate | 966 | 1243 | 1780 |
| Nonyl maleate | 1570 | 2327 | 3125 |
| Decyl maleate | 1046 | 1349 | 2343 |
| Lauryl maleate | 731 | 806 | 951 |
| Hexadecyl maleate | 752 | 793 | 995 |
| Octadecyl maleate | 827 | 1069 | 1842 |
| Phenyl maleate | 1362 | 1777 | 2125 |
| Dodecyl mercaptan maleate | 1362 | 1777 | 2132 |

The above results demonstrate that mono maleates effectively reduce initial melt viscosity and retard viscosity increases of the nitrile multipolymer during melt processing.

EXAMPLE 3

A dry polymer comprising about 85% acrylonitrile (AN) and about 15% methyl acrylate (MA) and dry stabilizer were intimately mixed on a roll mill for about 2 hours at room temperature. The torque required to masticate the melt, a measure of melt viscosity was reported in meter-grams (m-gm), color measurements were made and a maleimide stabilizer was compared to the maleates, and the results are set forth in Table III.

EXAMPLE 4

A dry polymer comprising about 85% acrylonitrile and about 15% ethyl acrylate (EA) and dry stabilizer were intimately mixed on a roll mill for about 2 hours at room temperature. The torque required to masticate the melt, a measure of melt viscosity was reported in meter-grams (m-gm) and color measurements were made, and the results are set forth in Table III.

EXAMPLE 5

A dry polymer comprising about 85% acrylonitrile, about 7% methyl methacrylate (MMA) and about 7% methyl acrylate and dry stabilizer were intimately mixed on a roll mill for about 2 hours at room temperature. The torque required to masticate the melt, a measure of melt viscosity was reported in meter-grams (m-gm) and color measurements were made, and the results are set forth in Table III.

EXAMPLE 6

A dry polymer comprising about 75% acrylonitrile and about 25% methyl methacrylate and dry stabilizer were intimately mixed on a roll mill for about 2 hours at room temperature. The torque required to masticate the melt, a measure of melt viscosity was reported in meter-grams (m-gm) and color measurements were made, and the results are set forth in Table III.

EXAMPLE 7

A polymer comprising about 85% acrylonitrile and about 15% methyl acrylate was prepared by a continuous feed emulsion process and recovered as described for polymer A. Dry stabilizer was added to the polymer and intimately mixed mechanically. The torque required to masticate the melt, a measure of melt viscosity was reported in m-gm and color measurements were made. The results are set forth in Table III and demonstrate lowered final torque values and improved final color.

TABLE III

| Example | Composition | Stabilizer (Added at 2%) | BB temp (°C.) | TORQUE | | | COLOR | |
|---|---|---|---|---|---|---|---|---|
| | | | | BB 10 min. m-gm | BB 20 min. m-gm | BB 30 min m-gm | Color 10 min. | Color 30 min. |
| 3 | AN/MA | none (comparative) | 200 | 1727 | 1626 | 1637 | 3 | 9 |
| | | phenyl maleimide (Comparative) | 200 | 1433 | 1363 | 1397 | 3 | 6 |
| | 85/15 | lauryl maleate | 200 | 1343 | 1368 | 1430 | 1 | 4 |
| 4 | AN/EA | none | 200 | 812 | 772 | 814 | 7 | 10 |
| | 85/15 | lauryl maleate | 200 | 560 | 518 | 535 | 3 | 6 |
| | | maleic acid | 200 | 543 | 563 | 602 | 4 | 7 |
| | | maleic anhydride | 200 | 608 | 579 | 622 | 4 | 7 |

TABLE III-continued

| Example | Composition | Stabilizer (Added at 2%) | BB temp (°C.) | BB 10 min. m-gm | BB 20 min. m-gm | BB 30 min m-gm | Color 10 min. | Color 30 min. |
|---|---|---|---|---|---|---|---|---|
| | | tridecyl maleate | 200 | 597 | 561 | 552 | 3 | 6 |
| 5 | AN/MMA/MA 85/7+/7+ | none | 200 | 1232 | 1266 | 1345 | 6 | 9 |
| | | lauryl maleate | 200 | 1054 | 913 | 893 | 3 | 5 |
| | | maleic acid | 200 | 979 | 1058 | 1176 | 3 | 6 |
| | | maleic anhydride | 200 | 924 | 958 | 1076 | 4 | 6 |
| | | octadecyl maleate | 200 | 834 | 857 | 879 | 3 | 6 |
| 6 | AN/MMA 75/25 | none | 200 | 428 | 414 | 409 | 5 | 10 |
| | | lauryl maleate | 200 | 293 | 293 | 304 | 2 | 4 |
| | | maleic acid | 200 | 310 | 338 | 360 | 3 | 5 |
| | | maleic anhydride | 200 | 310 | 321 | 344 | 3 | 5 |
| | | stearyl maleate | 200 | 298 | 298 | 304 | 2 | 4 |
| 7 | AN/MA 85/15 | none | 240 | 232 | 232 | 273 | 4 | 11 |
| | | lauryl maleate | 240 | 215 | 244 | 273 | 2 | 6 |
| | | C18 amine maleate salt | 240 | 209 | 215 | 256 | 3 | 8 |
| | | *Ca maleic acid full salt | 240 | 232 | 226 | 255 | 2 | 9 |
| | | *Ca lauryl maleate | 240 | 227 | 227 | 256 | 3 | 5 |
| | | *Mg lauryl maleate | 240 | 221 | 230 | 262 | 3 | 5 |
| | | *Sr lauryl maleate | 240 | 248 | 231 | 257 | 3 | 7 |
| | | *Ca tridecyl maleate | 240 | 227 | 221 | 254 | 2 | 5 |

*Wherein Ca = calcium, Mg = magnesium and Sr = strontium

The above results demonstrate that the inclusion of the stabilizer into the nitrile multipolymer greatly reduces viscosity of the nitrile multipolymer during melt processing. Further, the above table demonstrates that the color is better with the inclusion of the stabilizer into the nitrile multipolymer.

Additionally, Example 3 compares the stabilizer lauryl maleate to phenyl maleimide. The data demonstrates that the lauryl maleate is unexpectedly better in color and initial melt torque than the phenyl maleimide. It is unexpected that the lauryl maleate is a better stabilizer for a high nitrile multipolymer than the phenyl maleimide.

From the above description and examples of the invention those skilled in the art will perceive improvements, changes and modifications in the invention. Such improvements, changes and modifications within the skill of the art are intended to be covered by the appended claims.

What we claim:

1. A composition comprising a melt-processable high nitrile multipolymer being in admixture with a stabilizer composition said stabilizer composition comprising salts of maleic acid selected from the group consisting of calcium, magnesium, and combinations thereof; and salts of maleates selected from the group consisting of beryllium, magnesium, calcium, strontium, barium, aluminum salts of organic bases consisting of primary, secondary and tertiary alkyl and aryl amines containing $C_1$ through $C_{18}$ and combinations thereof; and salts of maleates selected from the group consisting of calcium, magnesium and combinations thereof; and combinations thereof and wherein said stabilizer composition reduces thermal degradation, decreases melt viscosity during thermal processing and reduced thermal discoloration of the high nitrile multipolymer.

2. The composition of claim 1, wherein the salt of maleic acid is selected from the group consisting of calcium, magnesium, and combinations thereof.

3. The composition of claim 1 wherein said salt is selected from the group consisting of beryllium, magnesium, calcium, strontium, barium, aluminum, salts of organic bases consisting of primary, secondary and tertiary alkyl and aryl amines containing $C_1$ through $C_{18}$ and combinations thereof.

4. The composition of claim 1, wherein the salt of maleates is selected from the group consisting of calcium, magnesium and combinations thereof.

5. The composition of claim 1, wherein the stabilizer comprises maleamide and its salts and is selected from the group consisting of mono-alkyl amides of maleic acid, di-alkyl amides of maleic acid, mono-aryl amides of maleic acid, di-aryl amides of maleic acids and combinations thereof.

6. The composition of claim 1, wherein the maleamide is selected from the group consisting of cetyl maleamide, di-cetyl maleamide, octyl maleamide, di-octyl maleamide, lauryl maleamide, di-lauryl maleamide, butyl maleamide, di-butyl maleamide, hexadecyl maleamide, di-hexadecyl maleamide, 2-ethylhexyl maleamide, di-2-ethylhexyl maleamide, phenyl maleamide, di-phenyl maleamide, tridecyl maleamide, di-tridecyl maleamide, octadecyl maleamide, di-octadecyl maleamide and the like.

7. The composition of claim 5, wherein said salt is selected from the group consisting of beryllium, magnesium, calcium, strontium, barium, aluminum, salts of organic bases consisting of primary, secondary and tertiary alkyl and aryl amines containing $C_1$ through $C_{18}$ and combinations thereof.

8. The composition of claim 7, wherein the salt of maleamides is selected from the group consisting of calcium, magnesium and combinations thereof.

9. A process for stabilizing a high nitrile multipolymer, said process comprises the steps of polymerizing a multi-monomer mixture consisting of an acrylonitrile monomer and one or more olefinically unsaturated monomer, a surfactant or suspending aid, a molecular weight modifier, a free-radical initiator, heating at a temperature in the range of about 40° C. to about 120° C. in the substantial absence of molecular oxygen; and subsequently adding a stabilizer composition to the multipolymer wherein said stabilizer composition is selected from the group consisting of salts of maleic acid selected from the group consisting of calcium, magnesium, and combinations thereof; and salts of maleates selected from the group consisting of beryllium, magnesium, calcium, strontium, barium, aluminum, salts of organic bases consisting of primary, secondary and tertiary alkyl and aryl amines containing $C_1$ through $C_{18}$ and combinations thereof; and salts of maleates selected from the group consisting of calcium, magnesium and combinations thereof; and combinations thereof.

10. The process of claim 9, wherein said stabilizer composition is added to the high nitrile multipolymer in the range of about 0.1% to about 10% by weight of the high nitrile multipolymer.

11. The process of claim 9, wherein said stabilizer composition is added to the high nitrile multipolymer in the range of about 0.2% to about 5% by weight of the high nitrile multipolymer.

12. The process of claim 9, wherein said stabilizer composition is added to the high nitrile multipolymer in the range of about 0.3% to about 3% by weight of the high nitrile multipolymer.

* * * * *